Aug. 17, 1965     D. E. CLAPP     3,201,565
OVEN HEATING SYSTEM
Filed Jan. 3, 1962     2 Sheets-Sheet 1
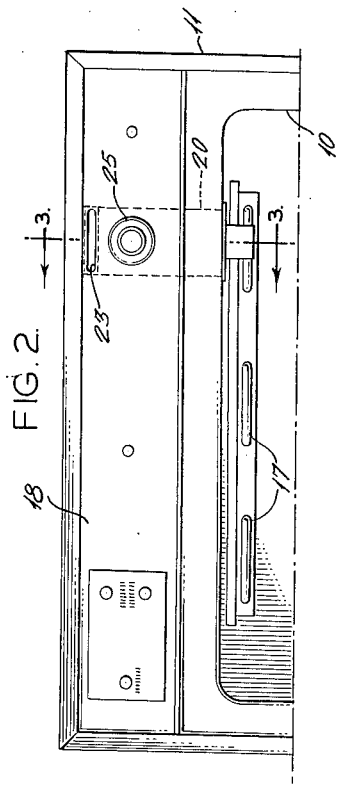
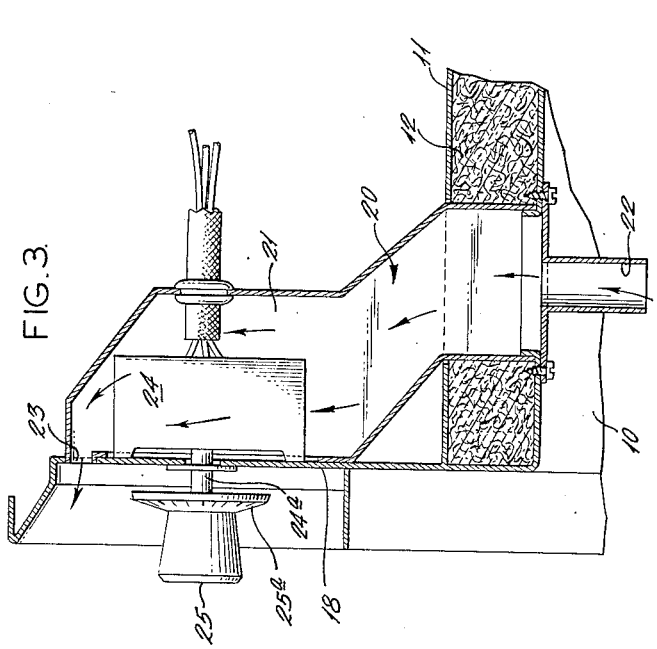
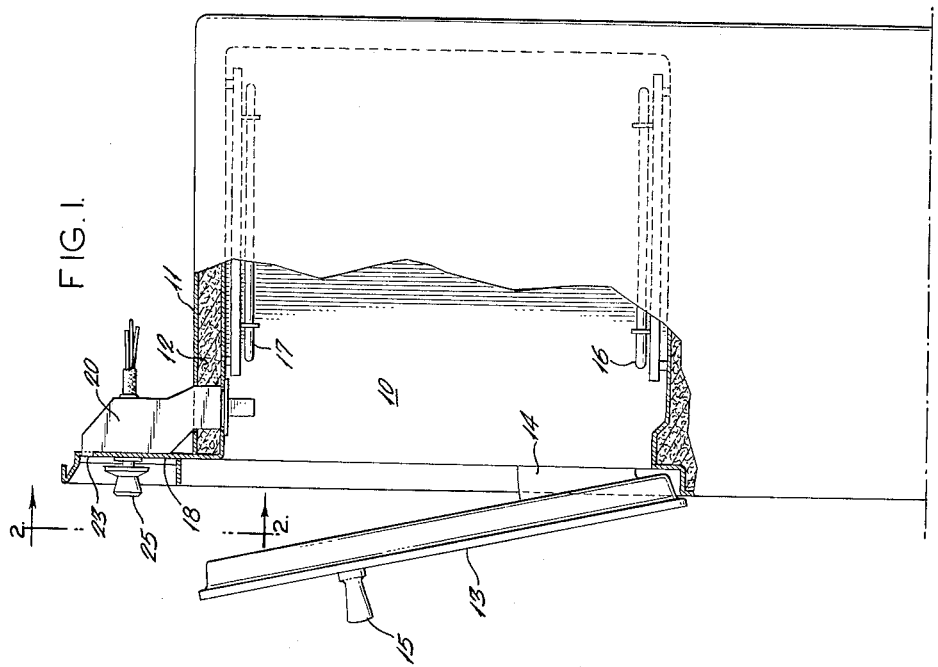
INVENTOR:
DANIEL E. CLAPP
BY *Howson & Howson*

Aug. 17, 1965   D. E. CLAPP   3,201,565
OVEN HEATING SYSTEM
Filed Jan. 3, 1962   2 Sheets-Sheet 2

INVENTOR:
DANIEL E. CLAPP
BY Howson & Howson
ATTYS.

United States Patent Office 3,201,565
Patented Aug. 17, 1965

3,201,565
OVEN HEATING SYSTEM
Daniel E. Clapp, Churchville, Pa., assignor, by mesne assignments, to King-Seeley Thermos Co., Ann Arbor, Mich., a corporation of Michigan
Filed Jan. 3, 1962, Ser. No. 164,070
30 Claims. (Cl. 219—413)

This invention relates to a heating system for an electric oven, and more particularly to novel control means for the heating elements.

Ordinarily, electric ovens are provided with two heating elements comprising a lower element, primarily for baking, and an upper element, primarily for broiling. Switching means are arranged to selectively energize these elements, and a thermostatic control, responsive to oven temperature is provided to maintain the oven at an average predetermined temperature. In some cases, an intermittently operating wattage controller is connected in the broiler circuit. Frequently provision is made for the simultaneous energization of both elements for rapid preheat prior to a baking operation.

One of the difficulties experienced with controls of the prior art is that there is usually an undesirable time lag in the response of the thermostatic control to changes in oven temperature, which may result in a very substantial spread between maximum and minimum temperatures for a given control setting during the baking operation.

It is therefore an object of this invention to provide heat-anticipating means whereby initial overshoot of temperature during the preheating step may be reduced, and whereby the oven is maintained at a susbtantially uniform temperature during the baking operation.

It is a further object of the invention to provide a single thermally operable switch that serves alternately for the regulation of the lower heating element and for the cyclic energization of the upper heating element.

Another object of the invention is to provide a control in which the contacts open and close cleanly and positively.

A further object of the invention is to arrange the control in such manner that it is responsive to oven temperatures without being affected by radiant heat from the heating elements.

Another object is to provide a simple and reliable control that may be inexpensively manufactured and installed.

The present invention relates to an oven temperature control system. The invention contemplates the use of an infinitely adjustable thermally operable switch having a thermomotive member controlling the position of one of its contacts and a resistance heater in heat-transfer relationship with the thermomotive member connected in circuit with the switch contacts. Such switches are well known as wattage controllers, ordinarily intended to be mounted remote from the controlled heating element. When used in this manner, they are usually provided with a bimetallic member responsive to ambient temperature arranged to substantially nullify variations in the temperature of the surrounding air. Conveniently, this bimetallic member is used as a supporting blade for the contact that is opposed to the contact controlled by the main thermomotive member, and it is oriented in such manner as to move in the same direction as the main thermomotive member when heated. In the present invention, no ambient compensating member is employed and contrary to the general practice the switch is arranged to be affected by temperature derived from the controlled heating element as well as by heat derived from the resistance heater.

Preferably, the switch, is mounted in a duct extending upward from the oven compartment, having an inlet within the compartment and an outlet communicating with the room. A selector switch is provided so that the thermally operable switch may be selectively connected to either of the heating elements. During baking operation, the control switch serves the same purpose as the thermostatic switch of the prior art but with closer control because of the heat-anticipating effect of the resistance heater. During the broiling operation, the oven door is left partly open, permitting relatively cool air to enter the duct in which the control switch is mounted. This tends to offset heat derived from the heating element and the switch then serves the same purpose as the wattage controller of the prior art, intermittently energizing the heating element, with a ratio of closed to open contact time dependent on the adjustment setting that varies the overclosure of the contacts. If, however, the oven door should be inadvertently closed, the increased amount of heat to which the control is exposed will result in a reduction of closed to open contact time, thereby automatically guarding against overheating.

Electric ovens are ordinarily provided with means for air circulation to offset condensation. For built-in or wall type ovens this usually comprises air inlet means at the bottom of the oven door and outlet means at the top of the door. When the control is to be mounted in a duct as herein described it is unnecessary to make any change in these standard provisions. For free-standing ranges, a tube of relatively large cross-sectional area is frequently arranged to exhaust the oven air through the center of a surface heating element. When a separate duct is provided for the control of this invention it may be desirable to omit the vent tube formerly used.

There are many advantages in placing the control in a duct leading from the oven, rather than in the oven itself. Among these are the following:

(a) A self-contained switch can be used, having the control dial outside the oven without the need for additional switches or hydraulic means.

(b) The switch operates at a lower temperature than that existing in the oven, permitting simplified construction and improved reliability.

(c) The control is not subject to radiant heat from the heating elements.

(d) It is removed from the food area and is therefore less liable to mechanical damage.

For convenience, a single dial is used connected to cam means arranged to control the positions of an on-off switch and a selector switch, and also by its adjustment establishing the desired oven temperature for baking or the desired percentage input for broiling.

In the accompanying drawings:

FIGURE 1 is a side elevational view partially in section of an oven employing the present invention;

FIGURE 2 is an elevational view seen from line 2—2 of FIGURE 1;

FIGURE 3 is a detail sectional view of the exhaust duct and control element taken along line 3—3 of FIGURE 2;

Figure 4:
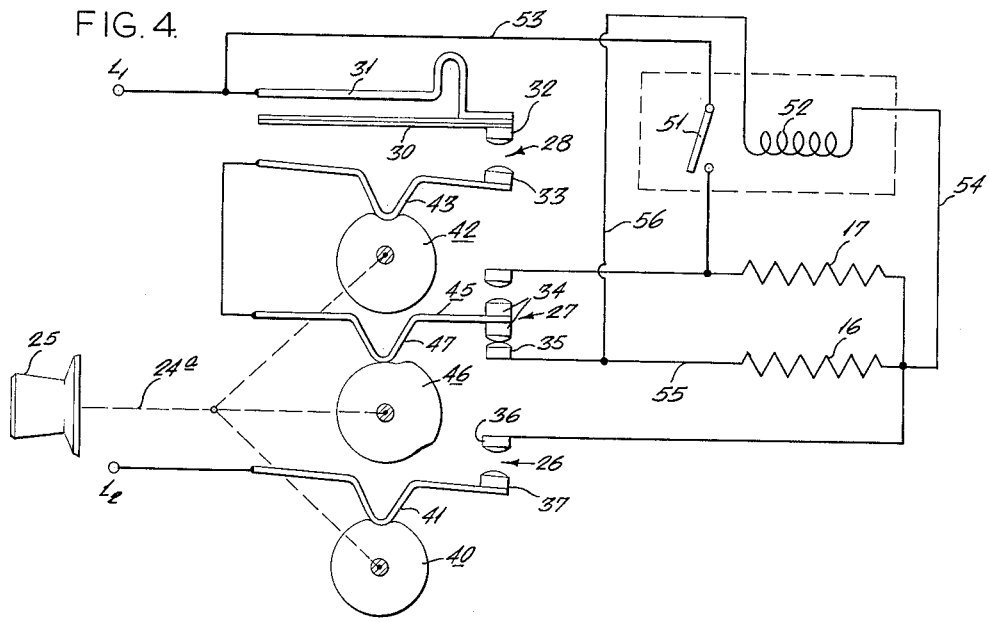
FIGURE 4 is a diagrammatic view illustrating the various elements of the invention in their circuit relationship and showing their relative position when the control knob is turned to the "off" position.

Referring to FIGURES 1-3 an oven of the built-in type is illustrated, although it will be understood that the invention may be applied to other types of ovens. The oven consists of a conventional sheet metal box enclosure 10 spaced from an outer sheet metal casing 11. Between these walls there may be provided a suitable insulating material 12 to inhibit heat flow outwardly from the oven. The open side of the oven enclosure from which it is filled is provided with a double walled door 13 hinged at each side near the bottom by conventional hinges 14 and provided with a handle 15 for opening and closing the door 13. The door has insulated double sheet metal construction similar to the side walls of the oven and is designed to overlap the edges of the side, top and bottom walls around the periphery of the opening. Inside the oven itself are the electric resistance heating elements 16 and 17, element 16 for baking and 17 for broiling. A control panel 18 is provided above the oven door 13 as best seen in FIGURE 2.

A duct 20 having an inlet 22 within the oven and an outlet 23 provides constantly open communication between the oven and the outside air. The upper portion 21 of the duct is enlarged to accommodate a housing 24 (see FIGURE 3) containing a thermally operable control which is responsive to oven temperatures but is not subject to radiant heat from the heating elements, which could result in a false response. An adusting knob 25 is mounted outside the oven, being affixed to a shaft 24a extending from control 24. Associated with knob 25 is a dial 25a which may be inscribed with calibration legends as shown in FIGURE 7, to be used in conjunction with a fixed reference mark directly vertically above the dial. The angular position of the knob as shown by dial position relative to the mark controls a plurality of cams which act upon various cam followers as discussed hereinafter. Preferably, the cams comprise separate face contours upon a single rotary cam member but they are shown in exploded form in the diagrammatic views of FIGURES 4 to 6 in order to clearly indicate the circuit relationships.

Figure 5:
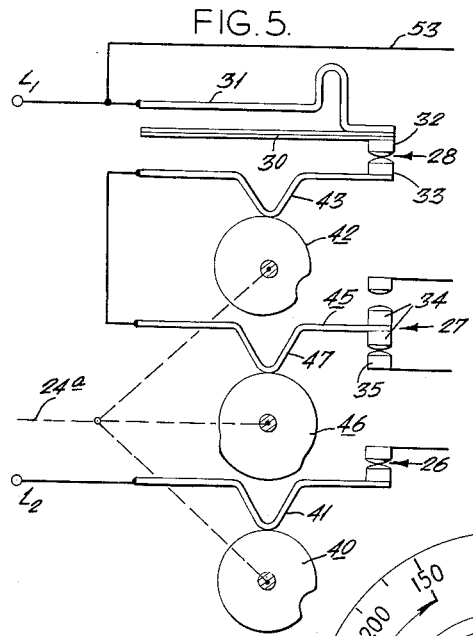
FIGURE 5 is a view corresponding to part of FIGURE 4 illustrating the switches positioned for baking.
Figure 6:
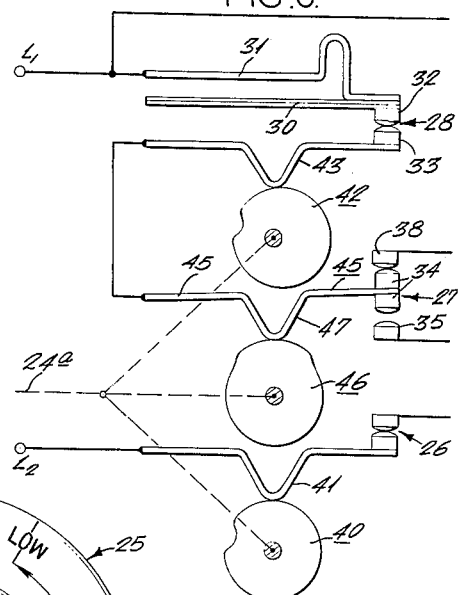
FIGURE 6 is a view corresponding to that of FIGURE 5 showing the switches in their broiling setting.
Figure 7:
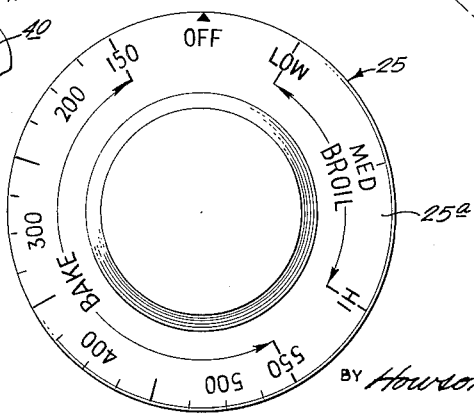
FIGURE 7 is a front plan view of a dial associated with the switches and calibrated to effect settings shown in FIGURES 4-6.

As illustrated in FIGURES 4 to 6, the basic units of the control includes an on-off switch 26, a selector switch 27, and a thermally operable switch 28. Switch 28 is an infinitely adjustable switch comprising a bimetallic member 30 and a resistance heater 31 in circuit with its contacts 32 and 33. The resistance heater is preferably in the form of a metallic strip that is mechanically bound together with bimetallic member 30 but insulated therefrom.

FIGURE 4 shows the various switch connections and cam followers in the position that they occupy when control knob 25 is in the "off" position shown in FIGURE 7 and neither of the heating elements is energized. Under this condition, contacts 32, 33 of switch 28 are in open position. Contact 34 of switch 27 engages contact 35 through its normal bias, and contacts 36, 37 of on-off switch 26 are in open position.

As shown in FIGURES 5 and 6 when knob 25 is turned to any "on" position, it rotates shaft 24a to which it is affixed and thereby turns cam 40 into a position to engage cam follower 41 and close switch 26. This switch remains closed regardless of any adjustment of the knob until it is moved to the "off" position.

As seen in FIGURE 5, when knob 25 is moved to a baking position, cam 42 engages cam follower 43 to close contacts 32, 33 and to resiliently displace contact 32, the extent of the displacement depending on how far the knob is turned. As the dial 25a of FIGURE 7 is rotated in a clockwise direction, the contour of cam 42 causes contact 32 to be progressively increasingly displaced whereby a higher and higher temperature is required to cause the contacts to open.

The baking circuit may be traced from line terminal L2 through switch 26, lower heating element 16, confacts 35, 34, blade 45, contacts 33, 32 and resistance heater 31 to terminal L1. When this circuit is established, the resultant energization of the lower heating element raises the temperature of the air in the oven and heated air rises through the duct, causing bimetallic member 30 to flex toward open contact position. Additional heat is supplied by resistance heater 31 and the combined effects of these sources result in a prompt opening of the contacts when a predetermined temperature is reached, as represented by the control setting. This additional heat causes the bimetallic member and the contacts to operate at a higher temperature than the surrounding air, which prevents condensation of grease vapors and the like on these vital parts. Since resistance heater 31 is connected in series with the contacts, the heater is denergized when the contacts open, and they will remain open until a reduction in oven temperature permits bimetallic member 30 to cool and move in the oppposite direction. The resultant closure reenergizes heater 31, which causes the contacts to open promptly once more. This heat-anticipating effect provides extremely accurate regulation, the temperature level varying only a few degrees from the desired value. In contrast, with thermostatic of the prior art there is a time lag in response to oven heat that may result in a difference of 50 degrees F. or more between maximum and minimum temperature at a control setting representing average baking requirements.

The accuracy and reliability of the control of this invention is enhanced by the preferred form of switch 28 in which current flowing through resistance heater strip 31 causes it to expand in a longitudinal direction thereby forcing contacts 32, 33 more firmly together. When the heat derived from the resistance heater causes the more active bimetal to move its contacts to open position, thereby deenergizing the heater, the resistance heater cools rapidly and its resultant contraction tends to increase the clearance between the contacts. This action results in clean and positive makes and breaks, and the combination of high contact pressure and wiping contact action incident to this construction assures reliable operation under the temperature and atmospheric conditions to which the control is exposed.

FIGURE 6 illustrates the arrangement provided by moving knob 25 into any broil position. In this case, cam 46 engages cam follower 47, separating contact 34 from contact 35 and bringing it into engagement with contact 38, while cam 42 causes a varying amount of displacement of contact 32 by contact 33, depending on the setting of the knob 25. This establishes the broil circuit which may be traced from terminal L2 through switch 26, upper heating element 17, contacts 38, 34, blade 45, contacts 33, 32 and resistance heater 31 to line terminal L1. During the broiling operation, the oven door is partially opened allowing relatively cool air to flow into the duct, thereby tending to offset the oven heat. Under these conditions, the contacts of switch 28 open and close at a regular rate under the influence of series resistance heater 31, the ratio of closed to open time establishing the predetermined wattage input as determined by the dial setting and the cam contour. If, however, the oven door should be closed, thereby cutting off the inflow of cooler air, the heated air rising through the duct automatically reduces the ratio of closed to open contact time, and the control functions in the same manner as when set for baking, maintaining a predetermined oven temperature and thereby preventing overheating.

Provision may be made for preheating the oven before the baking operation. Preferably this include switch 51, biased toward open contact position, arranged for manual closure and held in closed position by solenoid 52. This switch is connected in circuit between line terminal L1 and heating element 17 by means of line 53. When the control is set for baking as shown in FIGURE 4, heating element 16 is energized as previously described. A closure of switch 51 energizes heating element 17, thereby supplying maximum heat to the oven. As illustrated, one side of solenoid 52 is connected to line terminal L2 through line 54, and the other side is connected into line 55 through line 56. The circuit may be traced from terminal L2 through switch 26, line 54, solenoid 52, line 56, contacts 35, 34, blade 45 and contacts 33, 32, to terminal L1. When contacts 33, 32 first open, under the control of bimetallic member 30, solenoid 52 is deenergized and switch 51 opens under its normal bias. This disconnects heating element 17 and it is not reenergized when contacts 33, 32 again close. The subsequent baking operation continues as previously described.

During preheating, the heat-anticipating effect of resistance heater 31 is effective to reduce the overshoot of temperature that is experienced with controls of the prior art. If overshoot is desired, in order to permit the walls of the oven to reach operating temperature and to offset the cooling of the air incident to the introduction of the food to be baked, this may be accomplished by housing the control in an insulating or metallic container. Such a provision slows up the response of the controller to rapidly increasing air temperature but still maintains extremely close regulation during steady state operation. The housing may also fully protect the switch parts from grease vapors.

In practicing this invention, the duct may be of any convenient cross-sectional area and length. Preferably, however, these are proportioned to limit the air flow in such manner as to provide a substantially lower temperature in the air surrounding the control than that existing in the oven. For operation at such lower temperature, a simplified construction may be used and reliability is improved. In practice, to facilitate calibration the duct is so constructed as to provide a fixed temperature drop, e.g. 100 degrees F., between the center of the oven and the outlet of the duct when the control is set for a normal baking temperature of 375 degrees F. This may be accomplished in a built-in or wall type oven, as illustrated, by providing a cross-sectional area of approximately 0.5 square inches. For ovens of free-standing electric ranges, in which a convenient mounting position for the control usually requires a longer duct, a greater cross-sectional area may be needed.

If desired, adjustable means may be provided at the inlet or outlet end of the duct arranged to vary the cross-sectional area to alter the rate of air flow therethrough at a given temperature setting. This provides additional means for adjusting the operation of the control.

When broiling, with the oven door open, it has been found that there is an outward sweep of hot air across the top of the oven. It is desirable, therefore, that the inlet to the duct be located at a point below the upper heating element. When this is done, the cooler outside air can flow into the duct beneath the warmer air moving in the opposite direction and can thereby fulfill its desired function.

The elimination of the wide temperature amplitude experienced with prior art controls results in a baking operation that is highly satisfactory without the provision for a proportion of top heat. If, however, such top heat is desired, this may be accomplished by connecting the baking element in series with a portion of the broiling element, or by providing a separate upper heating element arranged to be energized when baking is to be done. Other modifications will be apparent to persons skilled in the art, and it is therefore to be understood that the invention is not to be limited in interpretation except by the scope of the following claims.

I claim:

1. In an electric oven, a heating system comprising a heating element, a thermally operable switch including a pair of contacts one of which is controlled by a thermomotive member, a resistance heater in heat-transfer relationship with said thermomotive member connected in circuit with said contacts arranged to cause intermittent opening and closing of said contacts, electrical supply conductors, circuit means connecting said switch in series with said heating element and said supply conductors, and means subjecting said switch to surrounding ambient temperature changes which are proportional to heat changes in the oven derived from said heating element, said thermomotive member causing intermittent opening and closing of said contacts in response both to change in said ambient temperature and to heat derived from said resistance heater.

2. A heating system in accordance with claim 1, including means for varying said ambient temperature to vary the proportion of closed to open contact time.

3. In an electric oven, including walls enclosing an oven compartment and a door in the forward face thereof, a heating system comprising a heating element within said compartment, a duct extending upward from the upper portion of said compartment having an inlet within the compartment and an outlet outside the compartment, a thermally operable switch mounted within said duct including a pair of contacts one of which is controlled by a thermomotive member, a resistance heater in heat-transfer relationship with said thermomotive member connected in circuit with said contacts aranged to cause intermittent opening and closing of said contacts, electrical supply conductors, and circuit means connecting said switch in series with said heating element and said supply conductors.

4. A heating system in accordance with claim 3, including adjustable means for varying the cross-sectional area of the duct to adjust the operation of the control by varying the rate of air flow through the duct.

5. A heating system in accordance with claim 3, including means for causing relatively cool air to flow through said duct to tend to offset the effect of the oven heat.

6. In an electric oven including walls enclosing an oven compartment, a heating system comprising a lower heating element primarily for baking and an upper heating element primarily for broiling, electrical supply conductors, circuit means connecting said upper and lower heating elements in parallel to said supply conductors, a thermally operable switch including a pair of contacts the relative position of which is controlled by a thermomotive member, said thermomotive member being positioned to respond to heat derived from said heating elements, a resistance heater in heat-transfer relationship with said thermomotive member connected in circuit with the contacts of said switch arranged to cause intermittent opening and closing of said contacts, and a manually operable selector switch interconnected with said heating elements in such manner that said thermally operable switch may be selectively connected in series with either of said heating elements.

7. A heating system in accordance with claim 6 including means for adjusting the relative position of said contacts to vary the proportion of closed to open contact time.

8. In an electric oven including walls enclosing an oven compartment and a door in the forward face thereof, a heating system comprising a lower heating element primarily for baking and an upper heating element primarily for broiling, a duct extending upward from the upper portion of said oven compartment, a thermally operable switch mounted within said duct including a pair of contacts one of which is controlled by a thermomotive member, a resistance heater in heat-transfer relationship with said thermomotive member connected in circuit with said contacts arranged to cause intermittent opening and closing of said contacts, electrical supply conductors, circuit means connecting said heating elements in parallel to said supply conductors, and a manually operable selector switch interconnected with said heating elements whereby said thermally operable switch may be selectively connected in series with either of said heating elements.

9. A heating system in accordance with claim 8, wherein the duct is so proportioned as to create a substantial temperature drop between the interior of the oven and the location of the thermally operable switch.

10. A heating system in accordance with claim 8, including common means for adjusting the relative position of the contacts of the thermally operable switch and for positioning the selector switch.

11. A heating system in accordance with claim 8, wherein the inlet to said duct is positioned beneath the location of said upper heating element whereby cool air may be introduced into said duct by opening the door to vary the ratio of closed to open contact time.

12. In an electric oven, a heating system comprising a heating element, a thermally operable control switch for said heating element having a pair of relatively movable contact means and a thermomotive member for varying the relative positions of said contact means arranged to be responsive both to heat derived from the heating element and also to heat derived from a resistance heater connected in circuit with the contact means, and dual adjustment means comprising manual means for varying the relative position of the contact means and means for varying the ambient temperature surrounding said switch.

13. A heating system in accordance with claim 12, wherein the means for varying the ambient temperature includes means for causing relatively cool air to flow past said switch.

14. In an electric oven, a heating system comprising a heating element within said oven, a duct communicating with said oven through which air from the oven may flow, a thermally operable control including movable contact means, a thermomotive member controlling the relative positions of said contact means, said thermomotive member being mounted in said duct and responsive to temperature changes therein, the duct being positioned and proportioned in such manner as to create a substantial temperature drop between the interior of the oven and the location of said thermomotive member, electric supply conductors, and circuit means connecting said control in series with said heating element and said supply conductors.

15. A heating system in accordance with claim 14, wherein the thermally operable control is additionally responsive to heat derived from a resistance heater connected in circuit with the contact means.

16. In an oven, including walls enclosing an oven compartment, a heating system for said oven compartment, duct means extending from said oven compartment, thermally operable switch means mounted within said duct means and controllably associated with said heating system to control the temperature of said oven compartment, and heating means to transfer heat to said thermally operable switch means in said duct means extending from said oven compartment to control said heating system in accordance with temperatures attained in said oven compartment.

17. The invention as defined in claim 16 and wherein said heating means provides a substantial temperature drop between said oven compartment and said thermally operable switch means so that said thermally operable switch means is actuated by lower temperatures than the temperature in said oven compartment, said lower temperature being directly proportional to the temperatures attained in said oven.

18. The invention as defined in claim 17 and having adjustable means to alter the rate of heat transfer between said oven compartment and said thermally operable switch means.

19. The invention as defined in claim 18 and wherein said adjustable means comprises means to vary the cross sectional area of said duct means.

20. In an electric oven, including walls enclosing an oven compartment, a heating system comprising a heating element within said compartment, duct means extending from said compartment and having an inlet within the compartment and an outlet outside the compartment, thermally operable switch means mounted within said duct means and being responsive to ambient temperatures in said duct means to control said heating system, electrical supply conductors, and circuit means connecting said switch means in series with said heating element and said supply conductors.

21. In an electric oven, electric heating means for said oven, electrical supply conductors, circuit means connecting said electric heating means to said supply conductors, duct means connected to said oven and having a temperature condition therein proportional to the temperature of said oven, thermally operable switch means in said circuit means for controlling said electric heating means and being mounted within said duct means and actuable by temperature conditions therein, and resistance heater means in heat transfer relation with said thermally operable switch means and being energizable in accordance with a condition of said electric heating means to conjointly control said switch means with temperature conditions in said duct means.

22. A heating system for an electric oven or the like comprising heating element means for heating the oven, circuit means for energizing said heating element means, control switch means in said circuit means and having open and closed conditions therein for controlling energization of said heating element means, a first control means for said switch means operative in the energized condition of said heating element means to cause said controlled switch means to deenergize said heating element means after a predetermined time, and a second control means responsive to actual temperature conditions caused by energization of said heating element means in the oven to cause said switch means to be opened upon attainment of a predetermined temperature condition in said oven.

23. The invention as defined in claim 22 and wherein said first control means comprises heater means in said circuit means and energizable during energization of said heating element means, and said switch means comprises a thermally responsive member responsive to heat generated by said heater means to open said switch means.

24. The invention as defined in claim 22 and wherein said switch means comprises a thermally responsive member and said second control means comprises a heat source for imparting heat to said thermally responsive member proportional to the heat generated in the oven by said heating element means to open said switch means and deenergize said heating element means upon attainment of a predetermined temperature condition in the oven.

25. The invention as defined in claim 24 and having adjusting means for said heat source for varying the heat imparted to said thermally responsive member to vary the opening of said switch means.

26. A system for heating an oven or the like and controlling temperature therein comprising a plurality of heating elements, circuit means for energizing said heating elements, said heating elements being connected in parallel, a single temperature controlling switch means having a single pair of contacts connected in said circuit means for controlling energization of the heating elements thermomotive means operably connected to said contacts for opening said contacts for deenergizing the heating elements upon attainment of a predetermined temperature condition in the oven, and selector switch means in said circuit means to selectively connect the heating elements of said single temperature controlling switch means.

27. The invention as defined in claim 26 and wherein one of the heating elements comprises a baking element and another of said heating elements comprises a broiling element, a single manual control operatively connected to said temperature controlling switch means and to said selector switch means to select said one or said other of said heating elements and to set temperatures for the selected heating elements.

28. The invention as defined in claim 27 and having means to adjustably position said temperature controlling switch means to attain deenergization of said heating element means upon attainment of varying temperature conditions in said oven.

29. The invention as defined in claim 28 and wherein said means comprises separate control portions for setting said temperature conditions for each of said heating elements.

30. The invention as defined in claim 29 and wherein said means further comprises cam means having an off position whereat said temperature controlling switch means is deactivated, a portion of said cam means providing a range of temperature adjustment for one of said heating elements upon movement in one direction from said off position and another portion of said cam means providing a range of temperature settings for another of said heating elements upon movement in the opposite direction from said off position.

References Cited by the Examiner

UNITED STATES PATENTS

| | | | |
|---|---|---|---|
| 2,240,144 | 4/41 | Mills | 126—41 |
| 2,388,839 | 11/45 | Fry | 219—398 |
| 2,790,056 | 4/57 | Fry | 219—398 |
| 2,943,177 | 6/60 | Wantz et al. | 219—515 |
| 3,059,089 | 10/62 | Swisher | 219—391 |
| 3,093,722 | 6/63 | Schauer | 219—398 |
| 3,145,290 | 8/64 | Manecke | 219—413 |

FOREIGN PATENTS

| | | |
|---|---|---|
| 322,305 | 12/29 | Great Britain. |
| 667,171 | 2/52 | Great Britain. |
| 860,339 | 2/61 | Great Britain. |

RICHARD M. WOOD, *Primary Examiner.*